United States Patent
Okura

(10) Patent No.: US 11,002,714 B2
(45) Date of Patent: May 11, 2021

(54) LIQUID CHROMATOGRAPH, DEVICE AND METHOD FOR CALCULATING ELUTION TIME, AND DEVICE AND METHOD FOR DETERMINING MIXTURE RATIO

(71) Applicant: Kihachiro Okura, Osaka (JP)

(72) Inventor: Kihachiro Okura, Osaka (JP)

(73) Assignee: Yamazen Corporation, Osaka (JP)

( * ) Notice: Subject to any disclaimer, the term of this patent is extended or adjusted under 35 U.S.C. 154(b) by 584 days.

(21) Appl. No.: 14/953,856

(22) Filed: Nov. 30, 2015

(65) Prior Publication Data

US 2016/0077065 A1 Mar. 17, 2016

Related U.S. Application Data

(62) Division of application No. 13/564,365, filed on Aug. 1, 2012, now abandoned.

(30) Foreign Application Priority Data

Aug. 5, 2011 (JP) .................................. 2011-17228

(51) Int. Cl.
*G01N 30/34* (2006.01)
*B01D 15/16* (2006.01)
(Continued)

(52) U.S. Cl.
CPC ........... *G01N 30/34* (2013.01); *B01D 15/166* (2013.01); *G01N 30/8631* (2013.01); *G01N 2030/027* (2013.01); *G01N 2030/347* (2013.01)

(58) Field of Classification Search
None
See application file for complete search history.

(56) References Cited

U.S. PATENT DOCUMENTS

2010/0012192 A1* 1/2010 Dourdeville ........ F16K 15/183
137/1
2012/0184715 A1* 7/2012 Felgenhauer ........ B01D 15/166
530/383

FOREIGN PATENT DOCUMENTS

JP 2007-003398 A 1/2007

OTHER PUBLICATIONS

Machine translation of JP2007003398 by Kihachiro. Date of translation: Jan. 5, 2015.

* cited by examiner

*Primary Examiner* — Kara M Peo
(74) *Attorney, Agent, or Firm* — Polsinelli PC

(57) ABSTRACT

Provided that elapsed time from the start of the flow-in of an eluent into a column is t0 and the mobility $R_f^c(t/t0)$ of a component c in a sample is represented by a function of elapsed time t from the start of the flow-in of a sample into the column, elution time $t_r^c$ from the flow-in of the sample into the column to the flow-out of the component c from the column is calculated by using Equation (1). In doing so, the mobility $R_f^c(t/t0)$ in Equation (1) is represented by Equation (2).

$$\int_0^{t_r^c} R_f^c\left(\frac{t}{t_0}\right) d\left(\frac{t}{t_0}\right) = 1 \quad (1)$$

$$R_f^c\left(\frac{t}{t_0}\right) = 1 - e^{-a\left(\frac{t}{t_0}\right)+b} \quad (2)$$

3 Claims, 8 Drawing Sheets

(51) Int. Cl.
*G01N 30/86* (2006.01)
*G01N 30/02* (2006.01)

LIQUID CHROMATOGRAPH, DEVICE AND METHOD FOR CALCULATING ELUTION TIME, AND DEVICE AND METHOD FOR DETERMINING MIXTURE RATIO

CROSS REFERENCE TO RELATED APPLICATION

The present application is a Divisional of U.S. application Ser. No. 13/564,365 filed on Aug. 1, 2012, which claims priority from Japanese Patent Application No. 2011-172288 filed on Aug. 5, 2011. The disclosure of each application is herein incorporated by reference in its entirety.

BACKGROUND OF THE INVENTION

1 Field of the Invention

The present invention relates to a liquid chromatograph, a device and method for calculating elution time, and a device and method for calculating a mixture ratio.

2 Description of the Related Art

In liquid chromatography, into a column filled with a stationary phase, a sample having a plurality of components and an eluent made up of solvents mixed in a predetermined mixture ratio and equivalent to a mobile phase are flown. In this regard, the sample flowing into the column together with the eluent adheres to the stationary phase filling the column and moves with the flow-down of the eluent, and is exhausted from the column after a predetermined period of time. The period of time required for exhausting each component in the sample is different between the components, in accordance with the affinity for the eluent, the interaction between the stationary phase of the column and each component, or the like. That is to say, a component having low affinity for the eluent and/or having close interaction with the stationary phase stays in the column for a long time. On the other hand, a component having high affinity for the eluent and/or having weak interaction with the stationary phase is exhausted soon. As a result, the sample passing through the column is separated into the components and the components elute.

It is required in the art of liquid chromatography to precisely estimate the elution time of each component in the sample in advance when the mixture ratio of the solvents is known, and to precisely estimate the mixture ratio of the solvents to cause the components to elute in predetermined elution time. Japanese Unexamined Patent Publication No. 2007-3398 recites a technology to calculate the elution time by an Equation (1) below, wherein the time length from the start of the flow-in of the eluent into the column to the start of the flow-out thereof is "t0", the timing indicating the elapsed time from the start of the flow-in of the sample into the column is "t", and the mobility of the component c in the sample, which is a function of the timing t, is $R_f^c(t/t0)$.

$$\int_0^{t_r^c} R_f^c\left(\frac{t}{t_0}\right) d\left(\frac{t}{t_0}\right) = 1 \quad (1)$$

SUMMARY OF THE INVENTION

According to the technology recited in Japanese Unexamined Patent Publication No. 2007-3398, when the mixture ratio of two solvents linearly changes from a first mixture ratio to a second mixture ratio which is greater than the first mixture ratio from the timing T0 to the timing T1, the elution time is calculated with the assumption that the mobility is represented by an oblique straight line where the horizontal axis indicates elapsed time from the start of the flow-in of the sample into the column whereas the vertical axis indicates the mobility $R_f^c(t/t0)$. In this regard, provided that the time length from the start of the flow-in of the eluent into the column having the length L0 to the flow-out from the column is t0 and the moving distance of the component during the time t0 is L, the mobility Rf of this component is represented as L/L0.

The present inventor has discovered that the elution time of each component in the sample calculated according to the technology of Japanese Unexamined Patent Publication No. 2007-3398 is slightly different from the measured elution time. It is therefore necessary to more precisely estimate the elution time. In addition to this, it is required to estimate in advance the rate of change in the mixture ratio of two solvents used for the elution of the components of the sample in a predetermined elution time.

An object of the present invention is to provide a liquid chromatograph, an elution time calculator, and a method that make it possible to precisely calculate an elution time of each component in a sample in liquid chromatography.

Another object of the present invention is to provide a liquid chromatograph, a mixture ratio calculator, and a method that make it possible to precisely calculate a rate of change in the mixture ratio of two solvents used for the elution of components of a sample in a predetermined elution time in liquid chromatography.

A liquid chromatograph of the present invention includes: a mixture ratio change rate storage unit configured to store a rate of change in a mixture ratio of two solvents, where the rate linearly changes from a first mixture ratio to a second mixture ratio higher than the first mixture ratio from a timing T0 to a timing T1; a mixing unit configured to generate an eluent in which the mixture ratio of the two solvents changes in accordance with the rate of change stored in the mixture ratio change rate storage unit; a column through which a sample composed of a plurality of components and the eluent generated by the mixing unit pass; a mobility storage unit configured to store the mobility $R_f^c(t/t0)$ of a component c in the sample, as a function of a timing t indicating elapsed time from the start of flow-in of the sample into the column to the start of flow-out of the sample from the column, provided that elapsed time from the start of flow-in of the eluent into the column to the start of flow-out of the eluent from the column is represented as t0; and an elution time calculating unit configured to calculate elution time $t_r^c$ from the start of the flow-in of the sample into the column to the elution of the component c from the column, by using Equation (1), the mobility $R_f^c(t/t0)$ stored in the mobility storage unit being represented by Equation (2).

$$\int_0^{t_r^c} R_f^c\left(\frac{t}{t_0}\right) d\left(\frac{t}{t_0}\right) = 1 \quad (1)$$

$$R_f^c\left(\frac{t}{t_0}\right) = 1 - e^{-a\left(\frac{t}{t_0}\right)+b} \quad (2)$$

(a indicates the rate of change in the mixture ratio whereas b indicates a constant regarding the initial mobility.)

In a later-described embodiment, a part of the data stored in the mixture ratio memory 21a is stored in the mobility memory 21c as the rate of change "a" in the mixture ratio.

The mixture ratio is in proportion to the mobility. The constant "b" derives from the initial mobility $R_{f0}$, and $b=\ln(1-R_{f0})$. This constant b may be measured by thin-layer chromatography (TLC) or liquid chromatography using a column. The constant b obtained by thin-layer chromatography is substantially identical with the constant b obtained by liquid chromatography using a column. This is because, as described in the paragraph 0073 and 0080 of Japanese Unexamined Patent Publication No. 2007-3398, the disclosure of which is herein incorporated by reference in its entirety, the relationship between the thin-layer chromatography and the liquid chromatography is represented as $t0/t_r^c = R_f^c$.

An elution time calculator of the present invention for liquid chromatography in which an eluent is generated by mixing two solvents while linearly changing a mixture ratio of the two solvents and the generated eluent and a sample composed of a plurality of components pass through a column, calculates elution time $t_r^c$ from the start of flow-in of the sample into the column to elution of a component c in the sample from the column, comprising: a mixture ratio change rate storage unit configured to store a rate of change in the mixture ratio of the two solvents, where the rate linearly changes from a first mixture ratio to a second mixture ratio higher than the first mixture ratio from a timing T0 to a timing T1; a mobility storage unit configured to store the mobility $R_f^c(t/t0)$ of the component c in the sample, as a function of a timing t indicating elapsed time from the start of flow-in of the sample into the column to the start of flow-out of the sample from the column, provided that elapsed time from the start of flow-in of the eluent into the column to the start of flow-out of the eluent from the column is represented as t0; and an elution time calculating unit configured to calculate elution time $t_r^c$ of the component c by using Equation (1), the mobility $R_f^c(t/t0)$ stored in the mobility storage unit being represented by Equation (2).

$$\int_0^{t_r^c} R_f^c\left(\frac{t}{t_0}\right) d\left(\frac{t}{t_0}\right) = 1 \quad (1)$$

$$R_f^c\left(\frac{t}{t_0}\right) = 1 - e^{-a\left(\frac{t}{t_0}\right)+b} \quad (2)$$

(a indicates the rate of change in the mixture ratio whereas b indicates a constant regarding the initial mobility.)

An elution time calculating method of the present invention for liquid chromatography in which an eluent is generated by mixing two solvents at a mixture ratio that is linearly changed from a first mixture ratio to a second mixture ratio higher than the first mixture ratio from a timing T0 to a timing T1, and the generated eluent and a sample composed of a plurality of components pass through a column, calculates elution time $t_r^c$ from the start of flow-in of the sample into the column to elution of a component c in the sample from the column, comprising the steps of: determining a rate of change in the mixture ratio of the two solvents; and provided that elapsed time from the start of flow-in of the eluent into the column to the start of flow-out of the eluent from the column is represented as t0 and the mobility $R_f^c(t/t0)$ of the component c in the sample is a function of a timing t indicating elapsed time from the start of flow-in of the sample into the column to the start of flow-out of the sample from the column, calculating an elution time $t_r^c$ of the component c based on Equation (1), the mobility $R_f^c(t/t0)$ being represented by Equation (2).

$$\int_0^{t_r^c} R_f^c\left(\frac{t}{t_0}\right) d\left(\frac{t}{t_0}\right) = 1 \quad (1)$$

$$R_f^c\left(\frac{t}{t_0}\right) = 1 - e^{-a\left(\frac{t}{t_0}\right)+b} \quad (2)$$

(a indicates the rate of change in the mixture ratio whereas b indicates a constant regarding the initial mobility.)

The present inventor has confirmed that the present invention makes it possible to precisely calculate elution time $t_r^c$ as compared to the technology recited in Patent Document 1. This is presumably because Equation (2) precisely reflects the mixture ratio at a portion where the band of the component exists in the column.

According to another aspect of the invention, a liquid chromatograph of the present invention includes: an elution time storage unit configured to store elution time $t_r^c$ from the start of flow-in of a sample composed of a plurality of components into a column to elution of a component c in the sample from the column; a mixing unit configured to generate an eluent by mixing two solvents at a mixture ratio that linearly changes from a first mixture ratio to a second mixture ratio higher than the first mixture ratio from a timing T0 to a timing T1; a column through which a sample composed of a plurality of components and the eluent generated by the mixing unit pass; a mobility storage unit configured to store the mobility $R_f^c(t/t0)$ of a component c in the sample, as a function of a timing t indicating elapsed time from the start of flow-in of the sample into the column to the start of flow-out of the sample from the column, provided that elapsed time from the start of flow-in of the eluent into the column to the start of flow-out of the eluent from the column is represented as t0; and a mobility determining unit configured to calculate a rate of change a of the mixture ratio and a constant b regarding initial mobility to satisfy Equation (1) for the elution time $t_r^c$ of the component c stored in the elution time storage unit, so as to figure out the mobility $R_f^c(t/t0)$ of the component c, the mobility $R_f^c(t/t0)$ stored in the mobility storage unit being represented by Equation (2).

$$\int_0^{t_r^c} R_f^c\left(\frac{t}{t_0}\right) d\left(\frac{t}{t_0}\right) = 1 \quad (1)$$

$$R_f^c\left(\frac{t}{t_0}\right) = 1 - e^{-a\left(\frac{t}{t_0}\right)+b} \quad (2)$$

(a indicates the rate of change in the mixture ratio whereas b indicates a constant regarding the initial mobility.)

According to another aspect, a mixture ratio determining device of the present invention for liquid chromatography in which an eluent is generated by mixing two solvents at a mixture ratio that is linearly changed from a first mixture ratio to a second mixture ratio higher than the first mixture ratio from a timing T0 to a timing T1, and the generated eluent and a sample composed of a plurality of components pass through a column, calculates mobility $R_f^c(t/t0)$ of the component c in elution time $t_r^c$ from the start of flow-in of the sample into the column to elution of a component c in the sample from the column, comprising: an elution time storage unit configured to store the elution time $t_r^c$ of the component c; a mobility storage unit configured to store the mobility $R_f^c(t/t0)$ of the component c in the sample, as a function of a timing t indicating elapsed time from the start of flow-in of the sample into the column to the start of flow-out of the sample from the column, provided that elapsed time from the start of flow-in of the eluent into the column to the start of flow-out of the eluent from the column is represented as t0; and a mobility determining unit configured to calculate a rate of change a of the mixture ratio and a constant b regarding initial mobility to satisfy Equation (1) for the elution time $t_r^c$ of the component c stored in the elution time storage unit, so as to figure out the mobility $R_f^c(t/t0)$ of the component c, the mobility $R_f^c(t/t0)$ stored in the mobility storage unit being represented by Equation (2).

$$\int_0^{t_r^c} R_f^c\left(\frac{t}{t_0}\right) d\left(\frac{t}{t_0}\right) = 1 \quad (1)$$

$$R_f^c\left(\frac{t}{t_0}\right) = 1 - e^{-a\left(\frac{t}{t_0}\right)+b} \quad (2)$$

(a indicates the rate of change in the mixture ratio whereas b indicates a constant regarding the initial mobility.)

According to another aspect, a mixture ratio determining method for liquid chromatography in which an eluent is generated by mixing two solvents at a mixture ratio that is linearly changed from a first mixture ratio to a second mixture ratio higher than the first mixture ratio from a timing T0 to a timing T1, and the generated eluent and a sample composed of a plurality of components pass through a column, calculates mobility $R_f^c(t/t0)$ of a component c in elution time $t_r^c$ from the start of flow-in of the sample into the column to elution of the component c in the sample from the column, comprising the steps of: determining the elution time $t_r^c$ from the start of flow-in of the sample into the column to elution of the component c in the sample from the column; and provided that elapsed time from the start of flow-in of the eluent into the column to the start of flow-out of the eluent from the column is represented as t0 and the mobility $R_f^c(t/t0)$ of the component c in the sample is a function of a timing t indicating elapsed time from the start of flow-in of the sample into the column to the start of flow-out of the sample from the column, calculating the mobility $R_f^c(t/t0)$ of the component c by calculating a rate of change a of the mixture ratio and a constant b regarding initial mobility based on Equation (1) for the elution time $t_r^c$ of the component c, the mobility $R_f^c(t/t0)$ being represented by Equation (2).

$$\int_0^{t_r^c} R_f^c\left(\frac{t}{t_0}\right) d\left(\frac{t}{t_0}\right) = 1 \quad (1)$$

$$R_f^c\left(\frac{t}{t_0}\right) = 1 - e^{-a\left(\frac{t}{t_0}\right)+b} \quad (2)$$

(a indicates the rate of change in the mixture ratio whereas b indicates a constant regarding the initial mobility.)

The present inventor has confirmed that the present invention makes it possible to precisely calculate the mobility of a component relative to a desired elution time, as compared to the technology recited in Patent Document 1. This is presumably because Equation (2) precisely reflects the mixture ratio at a portion where the band of the component exists in the column.

A non-transitory computer program product of the present invention is a computer-usable medium having a computer-readable program code that allows a computer to function as an elution time calculator and a mixture ratio determining device embodied therein. Examples of the recording medium include a semiconductor memory such as a ROM (Read Only Memory) and a RAM (Random Access Memory), an optical disc such as a DVD (Digital Versatile Disc) and a CD (Compact Disc), and a magnetic disc such as a hard disc (hard disk) and a FD (flexible disk). The program code may be downloaded as a data signal via a communications link from a remote computer or device and stored in a storage as a computer program product. Alternatively, the program code may be distributed as a computer program product stored in a recording medium. Furthermore, the program code may be written in one or more known program languages. The computer is not limited to a general-purpose computer such as a personal computer (PC); the computer may be a device dedicated to elution time calculation or mixture ratio determination.

According to the present invention, because the elution time of each component in the sample is precisely known, i.e., estimated in advance, the user is able to, visually for example, grasp the degree of separation of the components in advance, and evaluate the rate of change in the mixture ratio. Furthermore, this result makes it possible to select a column having an optimal size for separation and refinement.

In addition to the above, because in the present invention the mobility regarding the component in the desired elution time is precisely calculated, the liquid chromatography is executable in elution time which is short but sufficient for the separation of the components.

BRIEF DESCRIPTION OF THE DRAWINGS

Other and further objects, features and advantages of the invention will appear more fully from the following description taken in connection with the accompanying drawings in which.

DESCRIPTION OF THE PREFERRED EMBODIMENTS

First Embodiment

Figure 1:
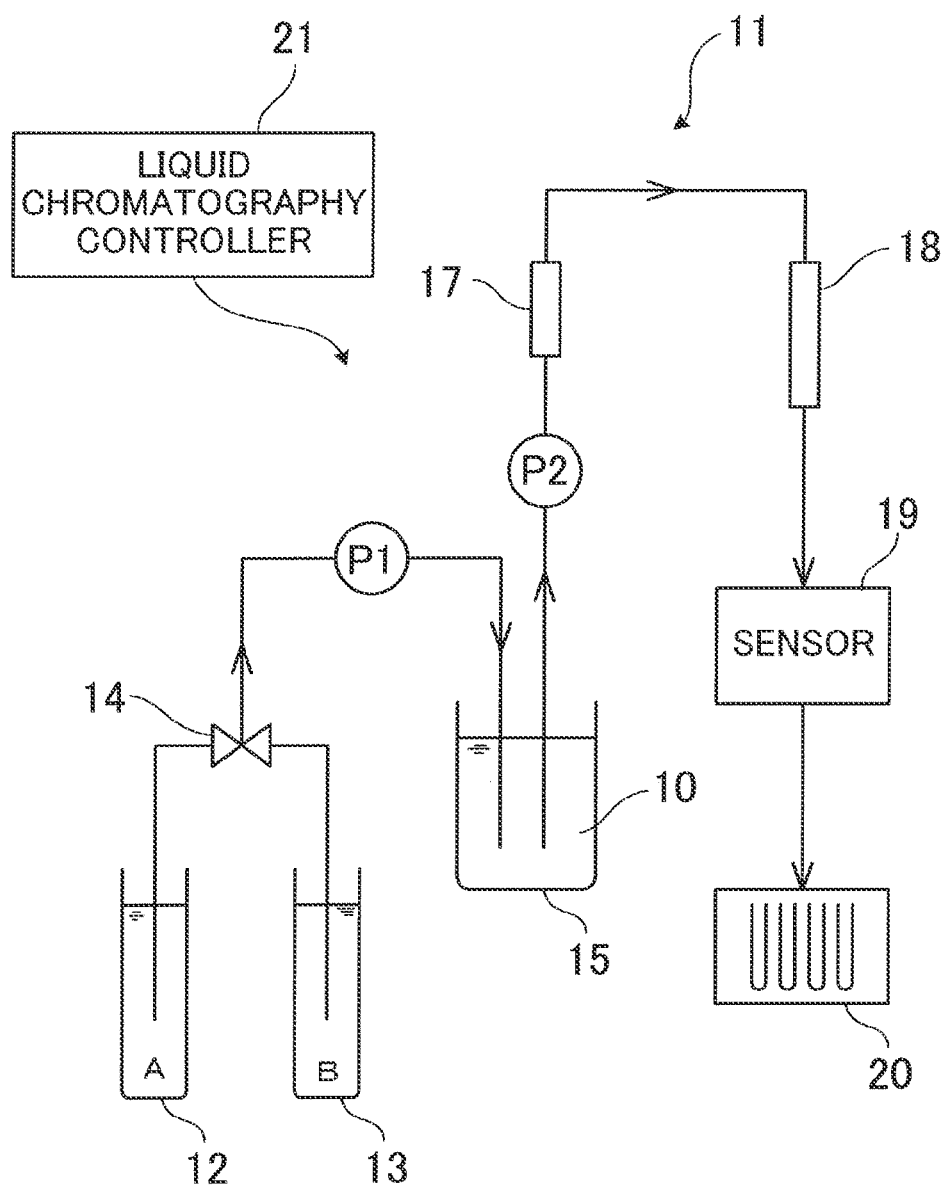
FIG. 1 outlines a liquid chromatograph according to a First Embodiment of the present invention.

To begin with, First Embodiment which is a preferred embodiment will be described. FIG. 1 outlines a liquid chromatograph 11 of First Embodiment.

<Outline of Liquid Chromatograph>

The liquid chromatograph 11 includes containers 12 and 13 storing solvents A and B, respectively, a solenoid valve 14, a pump P1, and a container 15 (which are mixing units). The solvents A and B stored in the containers 12 and 13 are pumped up by the pump P1 and temporarily stored in the container 15. The amounts of these solvents A and B to be pumped up are adjusted by the solenoid valve 14. As a result, the solvents A and B are mixed at a mixture ratio adjusted by the solenoid valve 14 and an eluent 10 which is a mobile phase is formed in the container 15.

The types of the solvents used as the eluent are not limited to two: the number of types may be increased in accordance with the use and object. The solvents A and B are typically non-polar molecules and polar molecules.

The liquid chromatograph 11 further includes a pump P2, an injector 17, and a column 18. The pump P2 pumps up the eluent 10 stored in the container 15 and causes the same to flow into the injector 17. In the injector 17 is provided a sample including a plurality of components. The sample provided in the injector 17 is flushed out to the column 18 together with the eluent pumped up by the pump P2.

The column 18 is filled with a stationary phase. The stationary phase in the present embodiment is silica gel. The sample having flown into the column 18 together with the eluent 10 which is the mobile phase moves as the eluent 10 flows down, while being absorbed by the stationary phase of the column 18, and the sample is eventually exhausted from the column after a predetermined period of time elapses. In this regard, the time required to exhaust each component in the sample is different between the components, in accordance with the affinity for the eluent, the interaction between the stationary phase of the column and each component, or the like. That is to say, a component having low affinity for the eluent and/or close interaction with the stationary phase stays in the column for a long time. On the other hand, a component having high affinity for the eluent and/or weak interaction with the stationary phase is exhausted soon. As a result, the sample provided in the column is separated into the components and the components elute.

It is noted that more than one column may be provided. For example, a plurality of columns are provided in a parallel manner, and a path is arranged to be selectable to realize plural types of liquid chromatography.

The liquid chromatograph 11 further includes a sensor 19 and a fraction collector 20. The sensor 19 detects each component of the sample eluting from the column 18. The fraction collector 20 stores the components in the sample in different test tubes, based on the detection result of the sensor 19.

The liquid chromatograph 11 further includes a liquid chromatography controller 21. This liquid chromatography controller 21 is electrically connected to the solenoid valve 14. As described below, the liquid chromatography controller 21 controls the solenoid valve 14 so as to adjust the mixture ratio of the solvents A and B. Furthermore, the liquid chromatography controller 21 is electrically connected to an unillustrated motor for driving the pumps P1 and P2, so as to be able to control the pumps P1 and 2.

<Outline of Liquid Chromatography>

The liquid chromatograph 11 arranged as described above performs liquid chromatography in the following manner.

To begin with, solvents A and B are stored in the containers 12 and 13. Also, a sample is provided in the injector 17.

Subsequently, the liquid chromatography controller controls the solenoid valve 14 so as to adjust the mixture ratio, and at the same time causes the pump P1 to pump up the solvents A and B. In so doing, the liquid chromatography controller 21 adjusts the mixture ratio based on, for example, a graph 25 shown in FIG. 2. The solvents A and B having been pumped up are mixed at the adjusted mixture ratio, and are temporarily stored in the container 15 as an eluent 10.

The graph 25 shows change in the mixture ratio of the solvents A and B over time. In the graph, the horizontal axis indicates elapsed time whereas the vertical axis indicates the ratio of the quantity of the solvent B to the total quantity of the solvents A and B. As the graph 25 shows, the time slots 28 are provided as G (gradient), T (top), FW (forward wash), and EQ (equilibration) (only EQ is not illustrated) in this order.

As shown in the graph 25, the mixture ratio of the solvents A and B is changed over time so as to linearly increase in the time slot G. In the time slots T and FW, the mixture ratio is constant.

Table 27 shows an example of the mixture ratio of the solvents A and B in each of the time slots 28. In the example shown in Table 27, the ratio between the quantity of the solvent A and the quantity of the solvent B is set at 80:20 at the start of the time slot G, and is set at 74:26 in the time slots T, FW, and EQ.

Thereafter, the liquid chromatography controller 21 controls the pump P2 so as to cause the pump P2 to pump up the eluent 10 stored in the container 15. The eluent 10 having been pumped up flows into the column 18 together with the sample provided in the injector 17. The components in the sample having flown into the column 18 are separated into each component and elute from the column 18 after a predetermined period of time elapses.

A graph 26 shows an elution curve of the sample flowing out from the column 18. In the graph, the horizontal axis indicates elapsed time whereas the vertical axis indicates absorbance. Each time the amount of a component in the sample eluting from the column 18 is peaked, a peak appears in the elution curve. The graph 26 shows such peak values PK1 and PK2.

Alternatively, the liquid chromatography controller 21 is provided with an unillustrated display, and the graphs 25 and 26 and Table 27 are displayed on this display.

In the specification, the phrase "when a component in the sample elutes from the column" indicates a timing at which the amount of the component in the sample eluting from the column 18 is maximum per unit time.

<Liquid Chromatography Controller>

Figure 3:
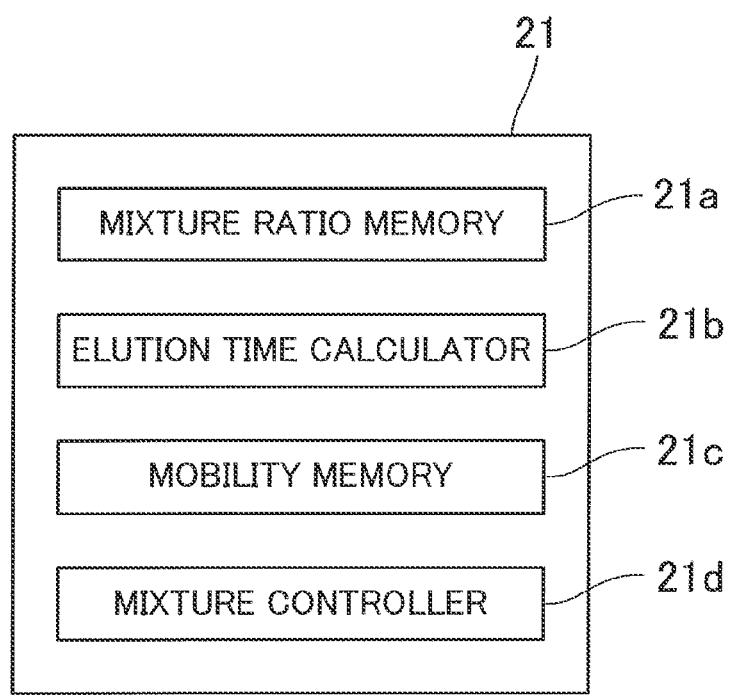
FIG. 3 is a block diagram of the liquid chromatography controller of FIG. 1.

The following will describe the liquid chromatography controller 21. FIG. 3 shows the configurations of controlled units of the liquid chromatography controller 21.

The functions of the liquid chromatography controller 21 are embodied by a general-purpose computer and a predetermined program code. This computer includes hardware such as a CPU (Central Processing Unit), a hard disc and a ROM (Read Only Memory) storing control programs executed by the CPU and data used by the control programs, a RAM (Random Access Memory) temporarily storing data when a program is executed, and a drive unit of FD and CD. The hard disc stores various software including a program code that causes the computer to function as a liquid chromatography controller. (This program code may be installed to any computer when stored in a removable recording medium such as CD, FD, and MO). By combining the hardware with the software, liquid chromatography controller 21 is constructed.

The liquid chromatography controller 21 includes a mixture ratio memory 21a, an elution time calculator 21b, a mobility memory 21c, and a mixture controller 21d.

The mixture ratio memory 21a stores data indicating the mixture ratio of the solvents constituting the eluent 10 changing over time, i.e., stores mixture ratios at the time slots G, T, and FW. This data indicating the mixture ratio is input before the liquid chromatograph 11 conducts the liquid chromatography. The data includes a rate of change in the mixture ratio in the time slot G shown in the graph 25 of FIG. 2 (or a combination of the start of the time slot G and the mixture ratio at this timing and the end of the time slot G and the mixture ratio at this timing). The mixture ratio linearly increases in the time slot G. Alternatively, the mixture ratio memory 21a stores data indicating plural types of mixture ratios changing over time, and a person executing the chromatography selects one of these types when executing the liquid chromatography.

The elution time calculator 21b calculates (estimates) in advance the elution time $t_r^c$ from the start of the flow-in of the sample into the column 18 to the elution of each component in the sample from the column 18, based on Equation (1). The elution time is the time in which the moving distance of each component crosses the total length L of the column. In the present embodiment, the sample starts to flow into the column 18 at a timing in the time slot G, and a timing at which each component elutes from the column 18 is also in the time slot G. In Equation (1), indicated by "t" is a timing indicating the elapsed time from the start of the flow-in of the sample into the column 18, and indicated by "t0" is time length from the start of the flow-in of the eluent into the column 18 to the start of the flow-out of the eluent from the column 18. Furthermore, the mobility $R_f^c(t/t0)$ in Equation (1) is stored in the mobility memory 21c and is represented by Equation (2). Furthermore, a result of integration by substituting Equation (2) into Equation (1) is represented by Equation (3).

$$\int_0^{t_r^c} R_f^c\left(\frac{t}{t_0}\right) d\left(\frac{t}{t_0}\right) = 1 \quad (1)$$

$$R_f^c\left(\frac{t}{t_0}\right) = 1 - e^{-a\left(\frac{t}{t_0}\right)+b} \quad (2)$$

$$\left[\left(\frac{t}{t_0}\right) + \frac{1}{a} e^{-a\left(\frac{t}{t_0}\right)+b}\right]_0^{t_r^c} = 1 \quad (3)$$

In Equation (2), indicated by "a" is a rate of change in the mixture ratio. As a rate of change a of the mixture ratio, a part of the data stored in the mixture ratio memory 21a is stored in the mobility memory 21c. The mixture ratio is in proportion to the mobility. Indicated by "b" is a constant determined by the initial mobility $R_{f0}$. More specifically, the constant b derives from the initial mobility $R_{f0}$, and $b=\ln(1-R_{f0})$. This constant b may be measured by thin-layer chromatography (TLC) or liquid chromatography using a column. The constant b obtained by thin-layer chromatography is substantially identical with the constant b obtained by liquid chromatography using a column. This is because, as described in the paragraph 0073 and 0080 of Japanese Unexamined Patent Publication No. 2007-3398, the relationship between the thin-layer chromatography and the liquid chromatography is represented as $t0/t_r^c = R_f^c$.

Figure 4:
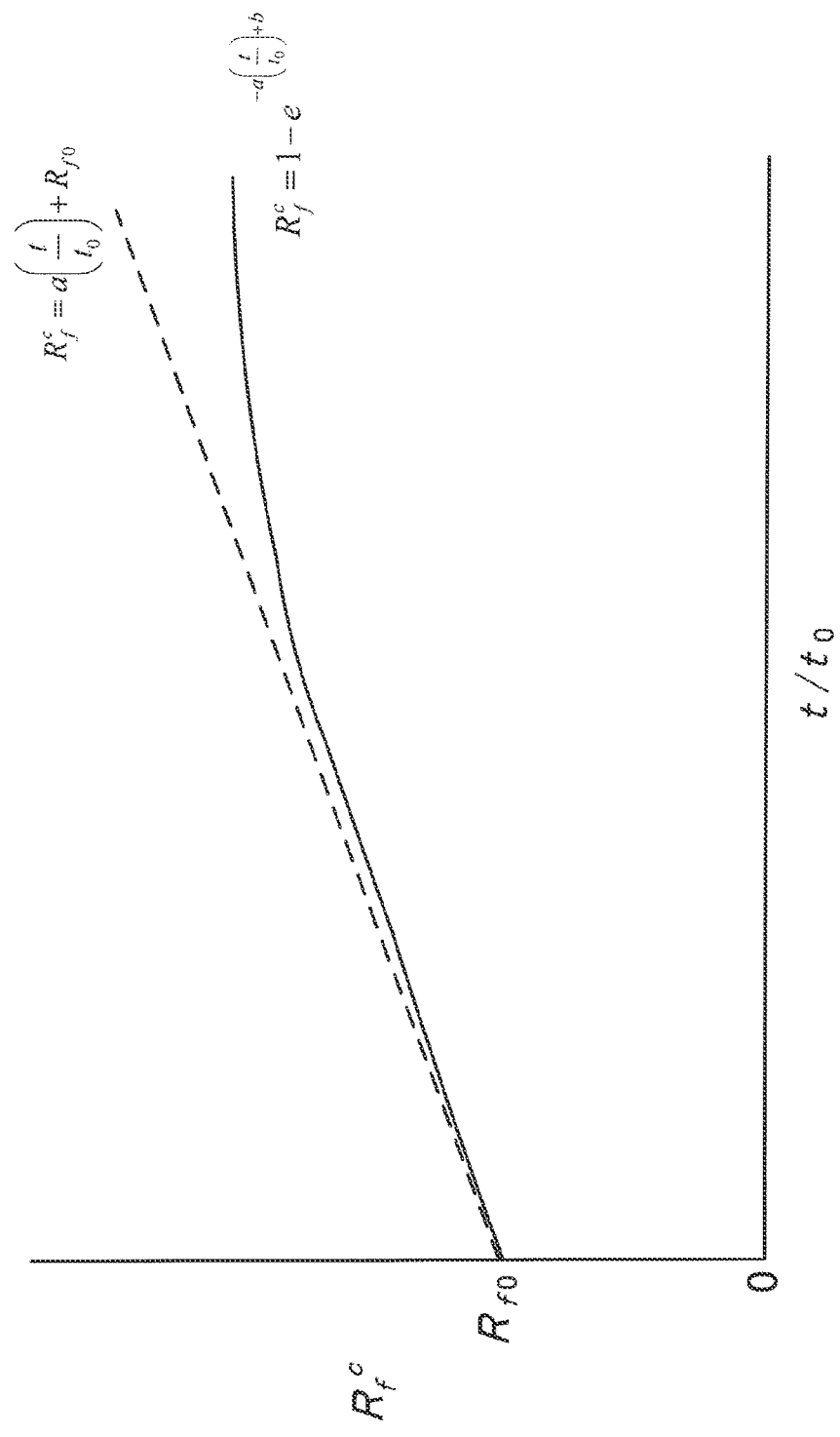
FIG. 4 is a graph of change in the mobility over time.

FIG. 4 is a graph of change in the mobility $R_f^c(t/t0)$ with respect to t/t0. Typically, in liquid chromatography, provided that the rate of change in the mixture ratio is "a" and the initial mobility (constant) is "$R_{f0}$", the mobility $R_f^c(t/t0)$ is represented by the straight line $a(t/t0)+R_{f0}$ that is indicated by a dotted line in FIG. 4. In the meanwhile, the mobility $R_f^c(t/t0)$ represented by Equation (2) is indicated by a curved full line slightly below the straight line. In Equation (2), the constant b is calculated by an equation $R_{f0}=1-e^b$ that holds when $t=0$.

It is confirmed that the elution time calculated by Equations (1) and (2) above is precise and almost identical with the measured elution time (see Examples below). This is presumably because, while the dotted line in FIG. 4 merely indicates the mixture ratio at the inlet of the column 18, the mobility curve represented by Equation (2) precisely reflects the mixture ratio at a portion where the band of the component c exists in the column 18.

The mixture controller 21d is electrically connected to the solenoid valve 14 and the pump P1 (see FIG. 1). The mixture controller 21d controls the solenoid valve 14 and the pump P1 based on the mixture ratio which is stored in the mixture ratio memory 21a and changes over time. With this, the solvents are mixed in accordance with the mixture ratio which is stored in the mixture ratio memory 21a and changes over time, and the eluent 10 is formed. The mixture ratio data stored in the mixture ratio memory 21a may be rewritten by a user after the elution time calculator 21b calculates the elution time.

<Flow of Liquid Chromatography>

Figure 5:
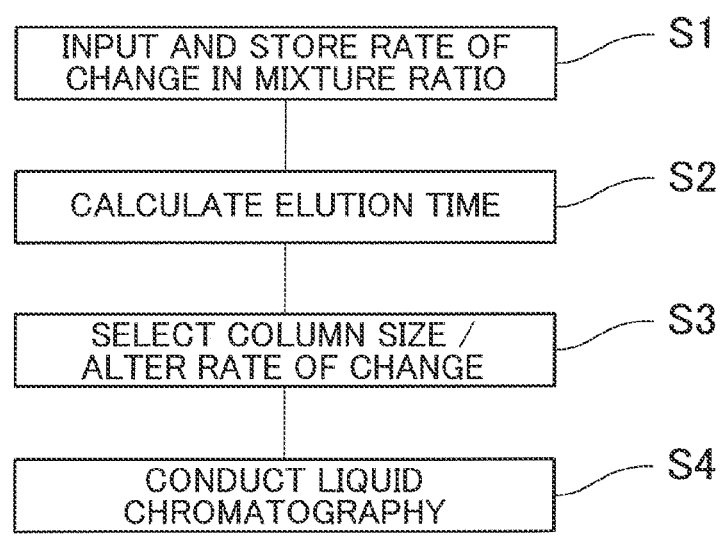
FIG. 5 is a flowchart of a procedure of liquid chromatography by the liquid chromatograph of FIG. 1.

Now, the flow of the liquid chromatography carried out by the liquid chromatograph 11 will be described with reference to FIG. 5.

To begin with, in S1, the user determines a rate of change in the mixture ratio in the time slot G, and inputs the determined rate to the liquid chromatography controller 21 by using an unillustrated input device. The input rate of change is stored in the mixture ratio memory 21a. In S2, the elution time calculator 21b calculates the elution time of each component c in the sample, by using Equations (1) and (2). The calculated elution time of each component c is displayed on a display as, for example, a graph (depicting peak positions). This allows a user to visually recognize to what extent the separation progresses.

In S3, based on the elution time of each component c calculated in S2, the liquid chromatography controller 21 selects an optimally-sized column 18 and displays the selected size on the display. When the elution time calculated in S2 is significantly different from a desired time, the rate of change in the mixture ratio stored in the mixture ratio memory 21a is further altered in S3. Alternatively, S2 may be carried out again. Subsequently, in S4, the mixture controller 21d conducts the liquid chromatography by using the rate of change in the mixture ratio stored in the mixture ratio memory 21a.

According to the present embodiment, because the elution time of each component in the sample is precisely estimated in advance, the user is able to, visually for example, grasp the degree of separation of the components in advance, and evaluate the rate of change in the mixture ratio. To achieve this, preferably, the elution time of each component is calculated in each of different rates of change in the mixture ratio by changing the rate of change stored in the mixture ratio memory 21a, and the result of this is displayed on a chromatogram. Furthermore, this result makes it possible to select a column having an optimal size for separation and refinement.

Second Embodiment

Now, Second Embodiment which is another preferred embodiment will be described. Second Embodiment and First Embodiment share the same structure in many aspects, and therefore the arrangements identical with those in First Embodiment may not be described again.

Figure 6:
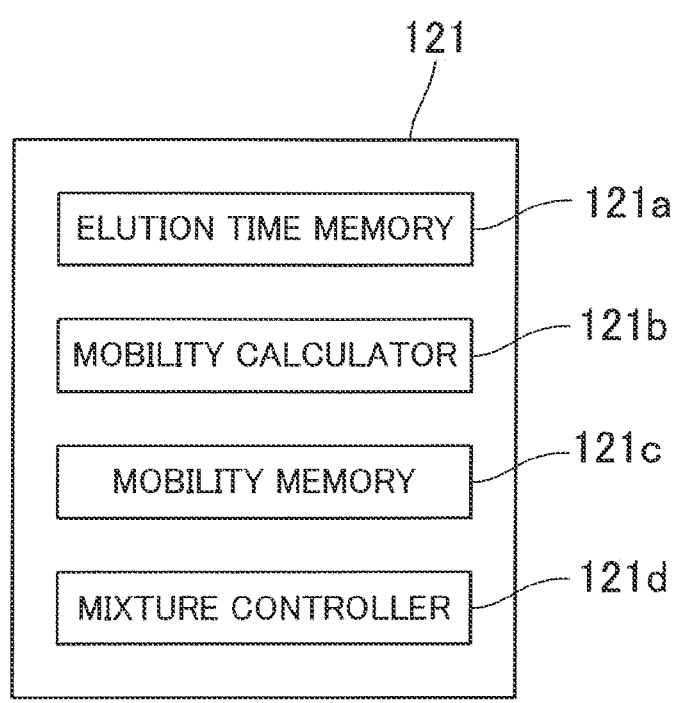
FIG. 6 is a block diagram of a liquid chromatography controller according to a Second Embodiment of the present invention.

A liquid chromatograph of Second Embodiment is more or less identical with the liquid chromatograph of First Embodiment. However, as shown in FIG. 6, a liquid chromatography controller 121 of Second Embodiment is different in structure from the liquid chromatography controller 21 of First Embodiment.

The liquid chromatography controller 121 includes an elution time memory 121a, a mobility calculator 121b, a mobility memory 121c, and a mixture controller 121d. Among these members, the mixture controller 121d is identical with the mixture controller of First Embodiment.

The elution time memory 121a stores a desired elution time of any one target component in the sample (or of each component in one modification). This desired elution time is input by a user.

The mobility calculator 121b calculates a rate of change a of the mixture ratio satisfying Equation (1) above and a constant b (indicating the initial mobility $R_{f0}$ of the component c) concerning the initial mobility, when the elution time $t_r^c$ from the start of the flow-in of a sample into the column to the flow-out of a target component from the column 18 is known. As a result, the mobility calculator 121b calculates the mobility $R_f^c(t/t0)$ concerning the component c. In the same manner as First Embodiment, the mobility $R_f^c(t/t0)$ (a and b are unknown) in Equation (1) is stored in the mobility memory 121c and represented by Equation (2). In the present embodiment, the mobility calculator 121b calculates the rate of change a of the mixture ratio and the constant b regarding the initial mobility with the assumption that the sample moves in the column only in the time slot G, with the result that the mobility $R_f^c(t/t0)$ regarding the component c is figured out. The mobility $R_f^c(t/t0)$ regarding the component c, which is calculated by the mobility calculator 121b, is stored in the mobility memory 121c as the mobility specific to that component c.

The mixture controller 121d is electrically connected to the solenoid valve 14 and the pump P1 (see FIG. 1). The mixture controller 121d controls the solenoid valve 14 and the pump P1 based on the mobility that is calculated by the mobility calculator 121b and stored in the mobility memory 121c. Therefore, solvents are mixed based on the calculated mobility, and an eluent 10 is formed. The elution time data stored in the elution time memory 121a may be rewritten by a user after the mobility calculator 121b calculates the mobility of the component c.

<Flow of Liquid Chromatography>

Figure 7:
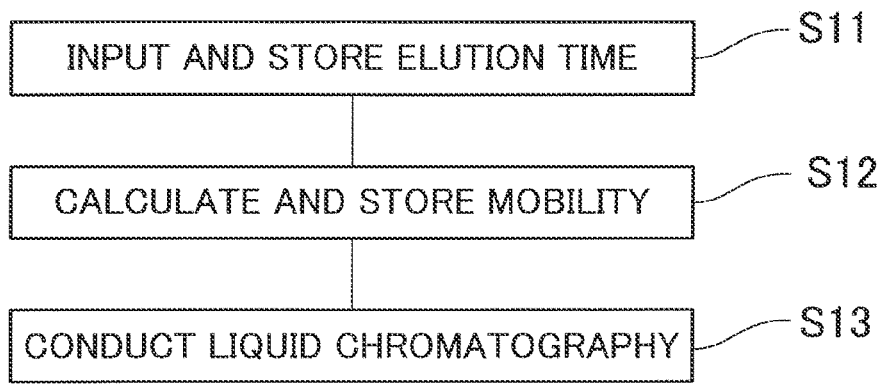
FIG. 7 is a flowchart of a procedure of liquid chromatography according to the Second Embodiment of the present invention.

Now, the flow of the liquid chromatography carried out by the liquid chromatograph of the present embodiment will be described with reference to FIG. 7.

To begin with, in S11, the user determines the elution time of a single target component and inputs the determined elution time to the liquid chromatography controller 121 by using an unillustrated input device. The input elution time is stored in the elution time memory 121a. Thereafter, in S12, the mobility calculator 121b calculates a rate of change a of the mixture ratio in the elution time of the single target component c stored in the elution time memory 121a and a constant b regarding the initial mobility by means of Equations (1) and (2), and the mobility $R_f^c(t/t0)$ regarding the component c is obtained. The obtained mobility $R_f^c(t/t0)$ regarding the component c is stored in the mobility memory 121c.

In S13, the mixture controller 21d conducts the liquid chromatography by using the mobility $R_f^c(t/t0)$ regarding the component c calculated in S12.

Because in the present embodiment the mobility $R_f^c(t/t0)$ regarding the component c in the desired elution time is precisely calculated, the liquid chromatography is executable in elution time which is short but sufficient for the separation of the components.

While the embodiment above describes normal-phase chromatography using a column filled with silica gel as a stationary phase, the present invention is applicable to reversed-phase chromatography, too. The reversed-phase chromatography may be performed using a C18 column filled with, as a stationary phase, chemically bonded porous spherical silica gel of which surface is modified with an octadecylsilyl group ($C_{18}H_{37}Si$).

Figure 2:
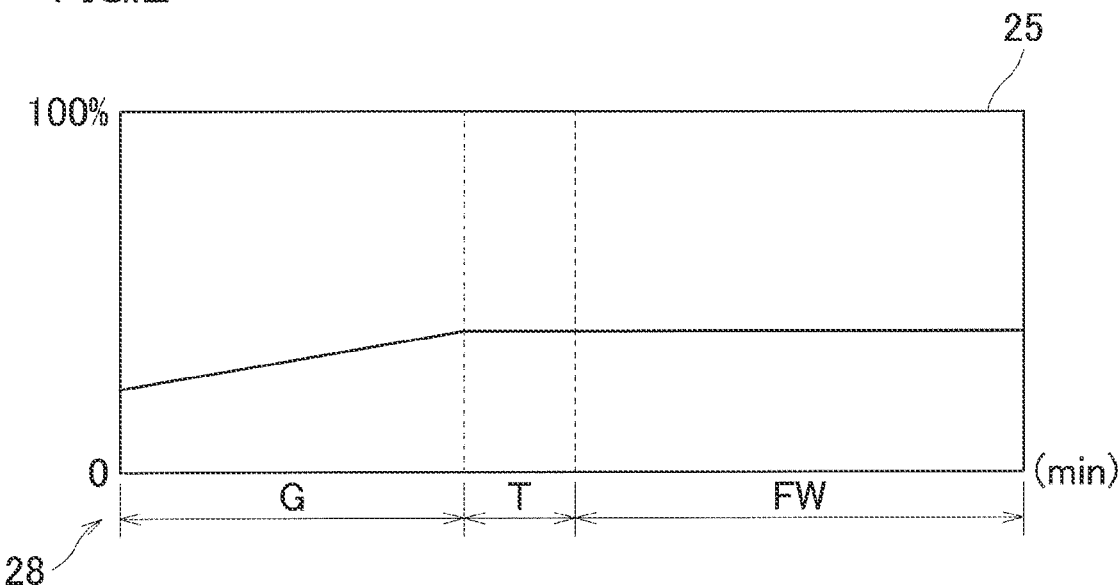
FIG. 2 shows an example of conditions of a mixture ratio of solvents concerning the eluent of FIG. 1 and a measurement result of components eluting by the liquid chromatograph of FIG. 1.
Figure 2:
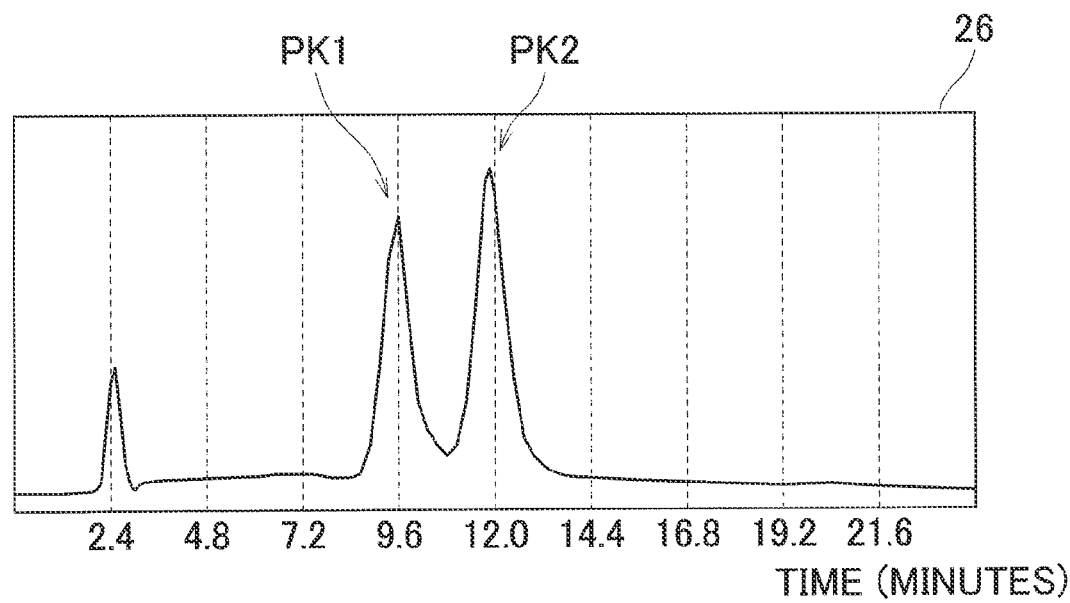

In addition, while in the above embodiment the separation in the gradient mode starts at the start of the chromatography as depicted in the graph 25 in FIG. 2, the separation may be carried out in such a way that, separation in isocratic mode in which the mixture ratio of the solvents A and B is constant is carried out for a predetermined period of time from the start of the chromatography, and separation in gradient mode starts from the end of the separation in the isocratic mode. In this case, the present invention is applicable in consideration of the movement of a desired component c in the column in the isocratic mode period. More specifically, the present invention is applied on the premise that the position at which the eluent and the component c flow into the column has been moved from the inlet of the column to a position which is below the inlet for a distance calculated by multiplying the isocratic mode period by $(1-e^b)$, i.e., on the premise that the column is shortened by the moving distance of the component c in the isocratic mode period.

In addition to the above, while in the embodiment above the component c elutes from the column in the gradient mode period, the component c may elute from the column in the isocratic mode period, which starts from the end of the gradient mode period. In this case, the present invention is applicable in consideration of the moving distance of the component c in the column until the timing at which the gradient mode ends. More specifically, the present invention is applied on the premise that the position at which the component c elutes from the column has been moved from the outlet of the column to a position which is above the outlet for a distance calculated by multiplying the time length between the start of the isocratic mode and the timing at which the component c elutes from the column by $(1-e^{-a+b})$, i.e., on the premise that the column is shortened by the moving distance of the component c in the column in the isocratic mode period.

Alternatively, separation in the isocratic mode is carried out from the start of the chromatography and separation in the gradient mode is carried out from the end of the isocratic mode, and the component c elutes from the column in the isocratic mode period that starts at the timing at which the gradient mode ends.

EXAMPLES

Using the liquid chromatograph described in First Embodiment above, an estimated elution time calculated by the elution time calculator 21b was compared with a measured elution time actually measured by using the liquid chromatograph, with different combinations of the rates of change a of the mixture ratio and the components c. The results of this will be described below with reference to FIG.

Figure 8:
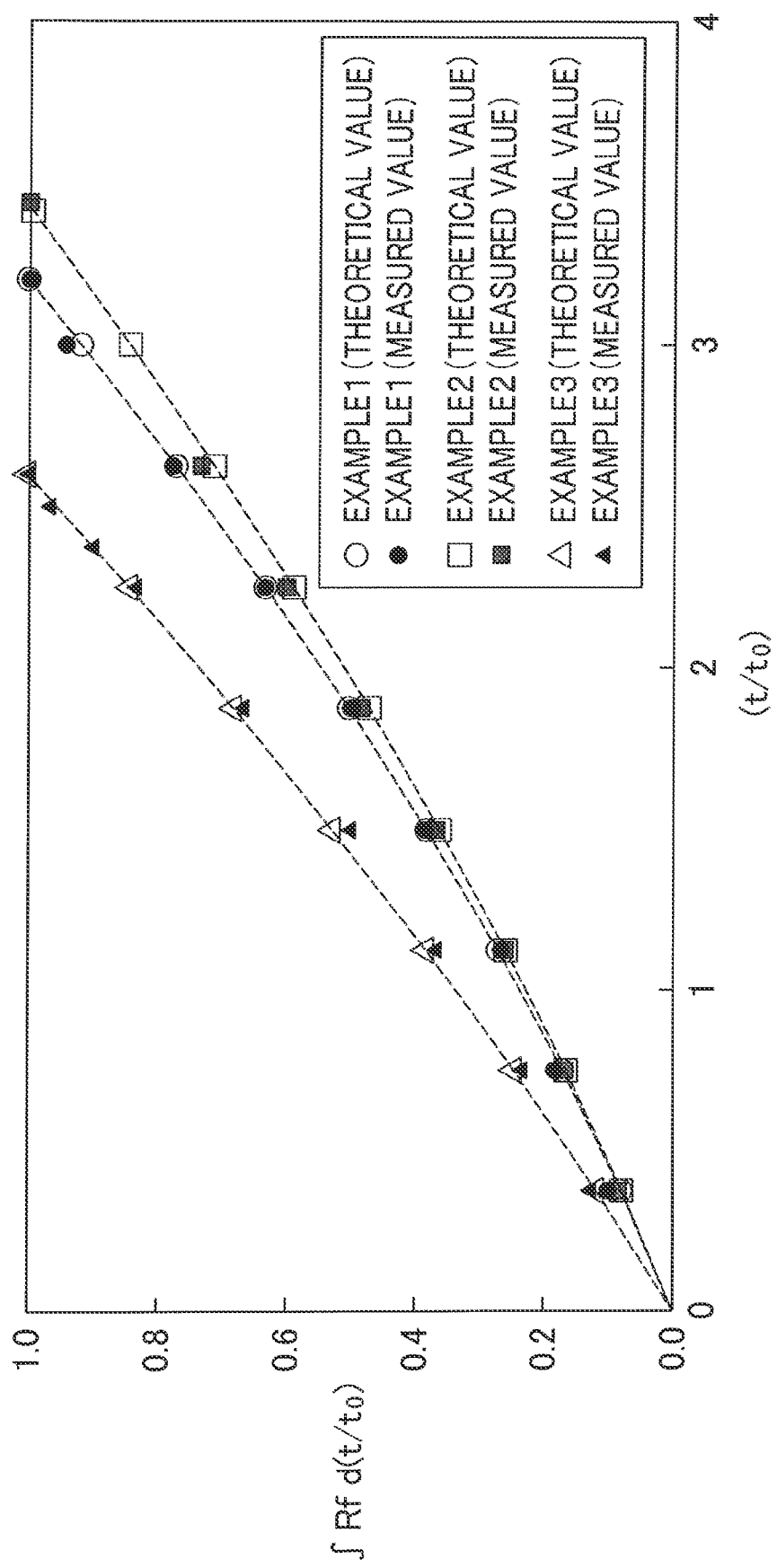
FIG. 8 is a graph of results in Examples.

8. It is noted that Examples presuppose the following conditions.
- Column Size: 15×300 mm
- Filler: Silica Gel
- Flow Velocity: 6 ml/mm
- Sample: red pigment (Sudan Red) or the like is included In Examples, t0 is 8 minutes. For this reason, the actual time (minutes) is eight times higher than the value indicated by the horizontal axis of FIG. 8. Furthermore, in FIG. 8, the elution time of a component is indicated by a timing at which a value (∫Rfd(t/t0)) of each curve in FIG. 8 is 1. In this Example, the value ∫Rfd(t/t0) at each of plural timings until the elution was calculated or measured in addition to the elution time, and such values are plotted on each curve.

Example 1

The estimated elution time calculated by the elution time calculator 21b was 25.6 when the rate of change a of the mixture ratio was 0.1 and the constant b regarding the component c (red pigment) was 0.22. On the other hand, the measured elution time actually measured by the liquid chromatograph under the same conditions was 25.5.

Example 2

The estimated elution time calculated by the elution time calculator 21b was 27.2 when the rate of change a of the mixture ratio was 0.075 and the constant b regarding the component c (red pigment) was 0.22. On the other hand, the measured elution time actually measured by the liquid chromatograph under the same conditions was 26.8.

Example 3

The estimated elution time calculated by the elution time calculator 21b was 20.8 when the rate of change a of the mixture ratio was 0.1 and the constant b regarding the component c (red pigment) was 0.36. On the other hand, the measured elution time actually measured by the liquid chromatograph under the same conditions was 21.2.

In this way, it was confirmed that the estimated elution times calculated by the elution time calculator 21b were very close to the measured times.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

What is claimed is:

1. A method for liquid chromatography,
in the liquid chromatography, an eluent being generated by mixing two solvents at a mixture ratio that is linearly increased, and the generated eluent and a sample composed of a plurality of components passing through a column,
the method comprising the steps of:
determining "a" which indicates a rate of change in the mixture ratio;
calculating elution time "$t_r^c$" based on Equation (1), the elution time "$t_r^c$" being from a start of flow-in of the sample into the column to elution of a component "c" which is one of the components from the column;

$$\int_0^{t_r^c} R_f^c\left(\frac{t}{t_0}\right) d\left(\frac{t}{t_0}\right) = 1 \tag{1}$$

selecting the column based on the calculated elution time "$t_r^c$"; and
conducting the liquid chromatography using the selected column;
wherein:
"t" indicates elapsed time from the start of flow-in of the sample into the column;
"t0" indicates time from a start of flow-in of the eluent into the column to a start of flow-out of the eluent from the column; and
"$R_f^c(t/t0)$" indicates a mobility of the component "c" in the elution time "$t_r^c$" and is represented by Equation (2), $$R_f^c\left(\frac{t}{t_0}\right) = 1 - e^{-a\left(\frac{t}{t_0}\right)+b} \tag{2}$$

wherein "b" indicates a constant regarding an initial mobility $R_{f0}$, b=ln(1-$R_{f0}$).

2. A method for liquid chromatography,
in the liquid chromatography, an eluent being generated by mixing two solvents at a mixture ratio that is linearly increased, the mixture ratio being adjusted by a valve, and the generated eluent and a sample composed of a plurality of components passing through a column,
the method comprising the steps of:
determining elution time "$t_r^c$", the elution time "$t_r^c$" being from a start of flow-in of the sample into the column to elution of a component "c" which is one of the components from the column;
calculating a mobility $R_f^c(t/t0)$ of the component "c" in the elution time "$t_r^c$", by calculating "a" and "b" for the elution time "$t_r^c$" based on Equations (1) and (2):

$$\int_0^{t_r^c} R_f^c\left(\frac{t}{t_0}\right) d\left(\frac{t}{t_0}\right) = 1 \tag{1}$$

$$R_f^c\left(\frac{t}{t_0}\right) = 1 - e^{-a\left(\frac{t}{t_0}\right)+b} ; \text{ and} \tag{2}$$

conducting the liquid chromatography by controlling the valve based on the calculated mobility $R_f^c(t/t0)$,
wherein:
"a" indicates a rate of change in the mixture ratio;
"b" indicates a constant regarding an initial mobility $R_{f0}$, b=ln(1-$R_{f0}$);
"t" indicates elapsed time from the start of flow-in of the sample into the column;
"t0" indicates time from a start of flow-in of the eluent into the column to a start of flow-out of the eluent from the column; and
"$R_f^c(t/t0)$" is represented by Equation (2).

3. The method of claim 2, wherein the valve is a solenoid valve.

* * * * *